(12) United States Patent
Riehle

(10) Patent No.: US 7,081,512 B2
(45) Date of Patent: Jul. 25, 2006

(54) TREATMENT OF RESINS TO LOWER LEVELS OF CPD-PRODUCING SPECIES AND IMPROVE GELATION STABILITY

(75) Inventor: Richard J. Riehle, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 10/838,636

(22) Filed: May 4, 2004

(65) Prior Publication Data

US 2004/0266984 A1 Dec. 30, 2004

Related U.S. Application Data

(60) Provisional application No. 60/472,391, filed on May 21, 2003.

(51) Int. Cl.
*C08F 6/00* (2006.01)

(52) U.S. Cl. ............. 528/480; 162/164.3; 524/17; 524/422; 524/608; 524/812; 524/846; 528/328.3; 528/486; 528/487

(58) Field of Classification Search ......... 162/164.3; 524/17, 422, 608, 812, 846; 528/480, 486, 528/487, 328.3
See application file for complete search history.

(56) References Cited

U.S. PATENT DOCUMENTS

| | | | |
|---|---|---|---|
| 2,926,154 A | 2/1960 | Keim | 260/29.2 |
| 3,197,427 A | 7/1965 | Schmalz | 260/29.2 |
| 3,332,901 A | 7/1967 | Keim | 260/29.2 |
| 3,352,833 A | 11/1967 | Earle | 260/78 |
| 3,891,589 A | 6/1975 | Ray-Chaudhuri | 260/29.2 |
| 4,240,935 A | 12/1980 | Dumas | 260/9 |
| 4,857,586 A | 8/1989 | Bachem et al. | 524/845 |
| 4,929,309 A | 5/1990 | Bachem et al. | 162/164.3 |
| 5,019,606 A | 5/1991 | Marten et al. | 523/414 |
| 5,171,795 A | 12/1992 | Miller et al. | 525/430 |
| 5,256,727 A | 10/1993 | Dulany et al. | 524/608 |
| 5,470,742 A | 11/1995 | Bull et al. | 435/262 |
| 5,714,552 A | 2/1998 | Bower | 525/420 |
| 5,843,763 A | 12/1998 | Bull et al. | 435/262.5 |
| 5,871,616 A | 2/1999 | Bull et al. | 162/164.3 |
| 5,972,691 A | 10/1999 | Bates et al. | 435/278 |
| 6,222,006 B1 | 4/2001 | Kokko et al. | 528/332 |
| 6,429,267 B1 | 8/2002 | Riehle | 525/430 |
| 6,554,961 B1 * | 4/2003 | Riehle et al. | 162/164.3 |
| 2003/0000667 A1 | 1/2003 | Riehle et al. | 162/164.1 |

FOREIGN PATENT DOCUMENTS

| | | |
|---|---|---|
| EP | 0 335 157 | 11/1989 |
| GB | 865 727 | 4/1961 |

* cited by examiner

*Primary Examiner*—Terressa M. Boykin
(74) *Attorney, Agent, or Firm*—Joanne Mary Fobare Rossi

(57) ABSTRACT

A process for treating a composition containing a polyamine-epihalohydrin resin that has a low level of CPD-producing species and good gelation stability is disclosed. A polyamine-epihalohydrin resin is prepared with a ratio of epihalohydrin:amine of less than about 1.1:1.0; The resin is then subjected to a base treatment followed by an acid treatment resulting in a resin that has good gelation storage stability and produces low levels of CPD.

22 Claims, No Drawings

TREATMENT OF RESINS TO LOWER LEVELS OF CPD-PRODUCING SPECIES AND IMPROVE GELATION STABILITY

CROSS REFERENCE TO RELATED APPLICATIONS

This application is related to U.S. Provisional Patent Applications Ser. No. 60/472,391, filed May 21, 2003 from which priority is claimed.

FIELD OF THE INVENTION

This invention relates to resins and aqueous compositions containing resins, and processes of forming resin compositions, especially for the paper industry, including strength agents. The present invention also relates to resins, as well as processes for their production, wherein the resins, and compositions and products, such as paper products, containing the resins have reduced residuals, such as epihalohydrins and epihalohydrin hydrolysis products. Still further, the present invention relates to resins, and compositions and products, such as paper products, which maintain low levels of residuals, such as epihalohydrins and epihalohydrin hydrolysis products, when stored. Still further, each aspect of the present invention relates to compositions having the resin at various solids contents, especially high solids contents.

BACKGROUND OF THE INVENTION

Wet strength resins are often added to paper and paperboard at the time of manufacture. In the absence of wet strength resins, paper normally retains only 3% to 5% of its strength after being wetted with water. However, paper made with wet strength resin generally retains at least 10%–50% of its strength when wet. Wet strength is useful in a wide variety of paper applications, some examples of which are toweling, milk and juice cartons, paper bags, and liner board for corrugated containers.

Dry strength is also a critical paper property, particularly in light of the recent trend for paper manufacturers to use high yield wood pulps in paper in order to achieve lower costs. These high yield wood pulps generally yield paper with significantly reduced strength when compared to paper made from highly refined pulps.

Wet strength resins also provide increased dry strength to paper.

Resins similar to those used for imparting strength to paper are also often used as creping adhesives. In the manufacture of some paper products such as facial tissue, bathroom tissue, or paper towels, the paper web is conventionally subjected to a creping process in order to give it desirable textural characteristics, such as softness and bulk. The creping process typically involves adhering the web, a cellulose web in the case of paper, to a rotating creping cylinder, such as the apparatus known as a Yankee dryer, and then dislodging the adhered web with a doctor blade. The impact of the web against the doctor blade ruptures some of the fiber-to-fiber bonds within the web and causes the web to wrinkle or pucker.

Polyamine-epihalohydrin resins, such as polyaminopolyamide-epihalohydrin resins often contain large quantities of epihalohydrin hydrolysis products. For example, commercial polyaminopolyamide-epichlorohydrin resins typically contain 0.5–10 wt % (dry basis) of the epichlorohydrin (epi) by-products, 1,3-dichloropropanol (1,3-DCP), 2,3-dichloropropanol (2,3-DCP) and 3-chloropropanediol (CPD). Epi by-products are also known as epi residuals. Production of such resins with reduced levels of epi by-products has been the subject of much investigation. Environmental pressures to produce resins with lower levels of adsorbable organic halogen (AOX) species have been increasing. "AOX" refers to the adsorbable organic halogen content of the resin, which can be determined by means of adsorption onto carbon. AOX includes epichlorohydrin (epi) and epi by-products (1,3-dichloropropanol, 2,3-dichloropropanol and 3-chloropropanediol) as well as organic halogen bound to the polymer backbone.

Several ways of reducing the quantities of epihalohydrin hydrolysis products have been devised. Reduction in the quantity of epihalohydrin used in the synthetic step is an alternative. Control over the manufacturing process is another option yielding compositions of reduced concentration of hydrolysis products. Treatment with nonpolymeric amine during the manufacturing process to yield compositions of reduced concentration of hydrolysis products is known. It is also known that chlorohydrin residues can be removed by adding both inorganic bases and amines. The chlorohydrin-removing steps are initiated after viscosity increase has taken place.

Post-synthesis treatments are also known. It is also known that epihalohydrin and epihalohydrin hydrolyzates can be reacted with bases to form chloride ion and polyhydric alcohols. Bases can be used during the synthetic step to reduce organo chlorine contents of wet strength composition to moderate levels (e.g., to moderate levels of from about 0.11 to about 0.16%) based on the weight of the composition. U.S. Pat. No. 5,019,606 teaches reacting wet strength compositions with an organic or inorganic base.

U.S. Pat. No. 5,256,727 teaches that reacting the epihalohydrin and its hydrolysis products with dibasic phosphate salts or alkanolamines in equimolar proportions converts the chlorinated organic compounds into non-chlorinated species. To do this, it is necessary to conduct a second reaction step for at least 3 hours, which adds significantly to costs and generates quantities of unwanted organic or inorganic materials in the wet strength composition. In compositions containing large amounts of epihalohydrin and epihalohydrin hydrolysis products (e.g., about 1–6% by weight of the composition), the amount of organic material formed is likewise present in undesirably large amounts.

Still further, U.S. Pat. No. 5,972,691 discloses the treatment of wet strength compositions with an inorganic base after the synthesis step (i.e., after the polymerization reaction to form the resin) has been completed and the resin has been stabilized at low pH, to reduce the organo halogen content of wet strength compositions (e.g., chlorinated hydrolysis products) to moderate levels (e.g., about 0.5% based on the weight of the composition). The composition so formed can then be treated with microorganisms or enzymes to economically produce wet strength compositions with very low levels of epihalohydrins and epihalohydrin hydrolysis products.

Other methods of treatment of the resins to reduce AOX content include treatments with carbon adsorbents, or ultrafiltration to produce polyaminoamide/epichlorohydrin resins with low AOX.

Halogenated by-products can be removed from products containing high levels of halogenated by-products as well as low levels of halogenated by-products by the use of basic ion exchange resins. However, there can be significant yield losses in wet strength composition and a reduction in wet strength effectiveness with this method.

It is known that nitrogen-free organohalogen-containing compounds can be converted to a relatively harmless substance. For example, 1,3-dichloro-2-propanol, 3-chloro-1,2-propanediol (also known as 3-chloropropanediol, 3-monochloropropanediol, monochloropropandiol, chloropropandiol, CPD, 3-CPD, MCPD and 3-MCPD) and epichlorohydrin have been treated with alkali to produce glycerol.

U.S. Pat. Nos. 5,470,742, 5,843,763 and 5,871,616, which are incorporated by reference herein in their entireties, disclose the use of microorganisms or enzymes derived from microorganisms to remove epihalohydrin and epihalohydrin hydrolysis products from wet strength compositions without reduction in wet strength effectiveness.

Moreover, U.S. Pat. No. 6,429,267 to Riehle, which is herein incorporated by reference in its entirety, discloses amongst other features, a process for reducing the AOX content of a starting water-soluble wet-strength resin comprising azetidinium ions and tertiary aminohalohydrin, which includes treating the resin in aqueous solution with base to form treated resin, wherein at least about 20 mole % of the tertiary aminohalohydrin present in the starting resin is converted into epoxide and the level of azetidinium ion is substantially unchanged, and the effectiveness of the treated resin in imparting wet strength is at least about as great as that of the starting wet-strength resin.

U.S. Pat. No. 6,554,961 to Riehle et. al. teaches an acid treatment. However the acid treatment of U.S. Pat. No. 6,554,961 is harsh in that it is conducted at a low pH and for a long period of time tending to degrade the molecular weight of to the polymer and decrease the reactive functionality resulting in lower wet strength efficiency. The acid treatment preferably is followed by a base treatment that rebuilt molecular weight and recovered wet strength efficiency. U.S. Pat. No. 6,554,961 taught acid treat first, followed by a base treatment.

U.S. Patent Application US 2003/0000667 A1, which is incorporated by reference in its entirety, is directed to high solids polyamine-epihalohydrin resin products, particularly polyamine-epihalohydrin resin products which can be stored with at least reduced formation of halogen containing residuals, such as CPD.

U.S. Pat. No. 6,222,006 describes thermosetting wet strength resins prepared from end-capped polyaminoamide polymers. The endcappers used are monocarboxylic acids or monofunctional carboxylic esters, and are used to control the molecular weight of the polyaminamide in order to obtain wet strength resins with a high solids content.

Each of the foregoing approaches has provided various results, and there has been a continuing need for improvement in the use of polyamine-epihalohydrin resin, especially at high solids content. In particular, there is still a need for resin compositions, such as wet strength, dry strength and creping agent resins, which can be provided in solutions or dispersion of reasonable viscosity at relatively high polymer solids concentrations. Thus, there is still a need for resins that can be prepared, stored, treated and transported as a dispersion or solution containing high solids concentrations without product deterioration from polymer crosslinking, such as gelation problems.

BRIEF DESCRIPTION OF THE INVENTION

A polyamide-epihalohydrin resin is heated, treated with base, viscosity may decrease and then allowed to rebuild (crosslink) and then quenched with a mild acid treatment to provide a gelation stable resin. By careful selection of the ratio of the amount of resin and the amount of base, the resulting resin has very low levels of CPD-producing species (polymer-bound CPD). This base treatment process has a crosslink rate that is easily managed in a production environment to provide a consistent product with the specified viscosity. However, the base-treated resin with very low polymer-bound CPD has very poor gelation stability, even when acid is added to a relatively low pH. It has been surprisingly discovered that the gelation stability can be dramatically improved for a base-treated resin with very low polymer-bound CPD if a relatively mild acid stabilization is conducted.

DETAILED DESCRIPTION OF THE INVENTION

Unless otherwise stated, all percentages, parts, ratios, etc., are by weight.

Unless otherwise stated, a reference to a compound or component includes the compound or component by itself, as well as in combination with other compounds or components, such as mixtures of compounds.

Further, when an amount, concentration, or other value or parameter, is given as a list of upper preferable values and lower preferable values, this is to be understood as specifically disclosing all ranges formed from any pair of an upper preferred value and a lower preferred value, regardless whether ranges are separately disclosed.

CPD that is formed in polyamine-epihalohydrin resins, after storage, is due to CPD-forming species that are associated with the oligomeric and/or polymeric component of the resin. Polyamine-epihalohydrin resins can be treated during and/or subsequent to production in such a manner so as to prevent the formation of, inhibit and/or remove elements associated with the polyamine-epihalohydrin resin which form CPD upon storage. The preferred polyamine-epihalohydrin resin treated by the present invention is a polyaminopolyamide-epihalohydrin resin. Some treatments to remove or reduce CPD-forming species of the resins include; acid treatment, base treatment, low acid end groups in the prepolymer, and enzyme treatment.

The present invention comprises a base treatment of polyamine-epihalohydrin resin followed by an acid treatment of the resin. It has been surprisingly discovered that by balancing treatment conditions, including pH, temperature, starting viscosity and solids concentration of polyamine-epihalohydrin resin containing compositions, could be treated with a basic agent to reduce or remove CPD-forming species with desired viscosity characteristics and excellent CPD release. These newly discovered conditions for base treatment allow the resin viscosity to be increased, decreased or maintained at the desired level, and permit the base treatment at low solids contents, as well as high solids concentrations of 15 wt % or greater. Additionally, an acid treatment after the base treatment has been surprisingly discovered to provide greatly enhanced gelation stability while maintaining high levels of azetidinium functionality.

The present invention is useful because it provides higher production throughput for the basic treatment and enhanced gelation stability. This technology therefore enables (1) production of high solids, high effectiveness resins by minimizing loss of azetidinium functionality, and (2) production of resins with lower levels of CPD-forming species. The resins according to the present invention are capable of being stored without undue formation of CPD.

It has been discovered that base treatment for reducing or removing CPD-forming species can be performed at higher solids content of resin than would be expected. Previous disclosures of the base treatment were done on resins samples that were about 13 wt % active solids or lower. Thus, the base treatment according to present invention can include solids contents as disclosed in the prior art, including concentrations as low as 4 wt % or lower. However, in contrast to the prior art, the solids content of the aqueous resin composition treated with basic agent according to the present invention can be higher than 13 wt %, more preferably higher than about 15 wt %, more preferably higher than about 18 wt %, and can be higher than about 25 wt %. Preferred solids content ranges include from about 13 to 30 wt %, more preferably about 15 to 27 wt %, more preferably about 18 to 25 wt %.

The at least one basic agent is added to the resin under suitable conditions to achieve sufficient hydrolysis of CPD forming species in the resin composition. Preferably, conditions of time, temperature, pH, starting viscosity, solids content, and epihalohydrin:amine of the resin are balanced in order to enable the hydrolysis reaction while minimizing degradation of performance of the resin, such as wet strength effectiveness of the resin or preventing undesirably high resin viscosity. Thus, unexpectedly the hydrolysis of CPD-forming species can be performed at high solids concentrations and/or epihalohydrin:amine ratios of less than 1.2:1.0 by balancing the conditions of time, temperature, pH, starting viscosity, and solids content.

Viscosity:

Not wishing to be bound by theory, it is believed that as the active solid content increases, the crosslinking rate increases and therefore the rate of viscosity rise increases. By judicious choice of reaction conditions, the rate of the crosslinking reactions that increases viscosity can be balanced with the rate of the polymer backbone hydrolysis reactions, which decreases viscosity, to predictably obtain desired viscosity. Viscosity is a measure of the quality of the resin. A resin with too high viscosity will have poor gelation stability. A resin with too low viscosity will result in a resin with lower wet strength efficiency.

It is noted that the viscosity of the resin composition can be increased or decreased from a starting viscosity during base treatment, and it can remain the same or substantially the same depending upon desired viscosity and reaction conditions as noted above. With respect to the above, it is preferred to balance or minimize other reactions, such as polymeric breakdown or molecular weight increase, such that the reaction mixture is held at a viscosity that enables the production of a desired viscosity resin. Preferably, viscosity is measured using a Brookfield LVDV-II+ Programmable Viscometer at 25° C., or an equivalent such as Brookfield DV II+, Spindle LV2 at 60 or 100 rpm, depending on the viscosity. For the programmable viscometer, the procedure used was based on the Operating Instructions, Manual No. M/97-164. This Viscometer will determine viscosity only if the correct spindle and rpm is used for the viscosity of the sample according to instruction manual.

It is further noted that conditions, preferably temperature, pH, and solids content, can be varied during the reaction. For example, if the viscosity of the reaction mixture is increasing at a rate that is higher than desired, the temperature can be lowered. There is an inverse relationship between the rate of viscosity increase and temperature. As temperature increases the rate of viscosity rise increases.

It has been surprisingly discovered that the present invention can also be used to reduce the molecular weight or viscosity of a polyamine-epihalohydrin resin containing composition. A base treatment would be expected to increase molecular weight or viscosity based on the prior art. By judicious choice of reaction conditions, a base treatment can be used to decrease molecular weight or viscosity. For instance, initially when the basic agent is added the viscosity can decrease. If the base treatment is quenched before the viscosity begins to rebuild the final viscosity of the resin will typically be lower than the initial starting viscosity at equal active solids. In other words, after the basic agent is added the reaction can be quenched resulting in a resin with lower viscosity at equal active solids. Therefore, the present invention is also directed to a process of reducing molecular weight or viscosity of a polyamine-epihalohydrin resin containing composition, comprising treating the composition containing polyamine-epihalohydrin resin with at least one basic agent.

Base Treatment:

Varying of the reaction conditions for the base treatment usually will change the time of the reaction. The pH and/or temperature can be lowered and/or additional basic agent can be added. Increasing temperature will decrease the time needed for the reaction. Higher solids content generally results in shorter base treatment time. Generally more basic agent is used for higher solids resins to obtain the desired reduction of CPD producing species.

The temperature of the base treatment can be at least about 20° C., more preferably about 25° C. to 65° C., more preferably about 30° C. to 60° C., more preferably about 35° C. to 55° C., even more preferably about 35° C. to 50° C. The reaction time can be at least about 5 min, at least about 10 minutes, at least about 20 minutes, the time can be 3 hours or more or up to 2 hours, or up to 1 hour. The time can be from about 5 minutes to 3 hours, more preferably about 10 minutes to 2 hours, more preferably about 20 minutes to 1 hour. The pH can vary between about 9.5 to about 12.5, preferably between about 10 to about 12.5, or between about 10.5 to 12.5 or preferably about 10 to 12, even more preferably about 10.5 to 11.6. The preferred pH values are measured at the preferred temperature of 35° C. to 50° C. The preferred pH values are measured after a 5 minute addition of the basic agent. The pH is preferably allowed to decrease during the base treatment. A typical pH decrease observed during base treatment is a starting pH of 11.4 and a decrease to 11.0.

Both organic and inorganic bases can be used in the present invention. A base is defined as any proton acceptor. Typical bases include alkali metal hydroxides, carbonates and bicarbonates, alkaline earth metal hydroxides, trialkylamines, tetraalkylammonium hydroxides, ammonia, organic amines, alkali metal sulfides, alkaline earth sulfides, alkali metal alkoxides, alkaline earth alkoxides, and alkali metal phosphates, such as sodium phosphate and potassium phosphate. Preferably, the base will be alkali metal hydroxides (lithium hydroxide, sodium hydroxide and potassium hydroxide) or alkali metal carbonates (sodium carbonate and potassium carbonate). Most preferably, the base comprises inorganic bases including sodium hydroxide and potassium hydroxide, which are especially preferred for their low cost and convenience.

After the base treatment the resin composition is quenched with acid. The pH of the resin composition is brought down to about between 1.0 and 4.0. Generally, although not required, the temperature after the acid quench is from about 25° C. to about 55° C.

Acid Treatment

Subsequent to the base treatment, a mild acid treatment is employed. The mild acid treatment comprises treating the resin at a temperature elevated above room temperature. The temperature of the acid treatment can be at least about 35° C., more preferably about 40° C. to 75° C., even more preferably about 45° C. to 70° C., even more preferably about 50° C. to 70° C., even more preferably about 50° C. to 65° C. The reaction time for the acid treatment can be about 20 minutes to 5 hours, more preferably about 30 minutes to 4 hours, more preferably about 40 minutes to 3 hours, more preferably about 50 minutes to 2.5 hours. The preferred treatment temperature and time are inversely related. As the treatment temperature decreases, the treatment time is preferably increased. Without wishing to be bound by theory, it is preferable to have much of the epoxide functionality formed in the base treatment process converted to chlorohydrin functionality in the acid treatment process. The pH of the acid treatment can vary between 1.0 and 4.0, preferably 1.5 to 3.5, preferably 1.8 to 3.5, preferably 1.8 to 3.2, preferably 2.0 to 3.0, even more preferably about 2.2 to 2.8. The preferred pH values are measured at 25° C. The preferred acid treatment pH is dependent on several factors, including the desired viscosity of the resin. As the acid treatment pH increases, within the preferred ranges, the viscosity tends to increase. Without wishing to be bound by theory, this pH and viscosity relationship during the acid treatment process is due to the balance of the crosslinking reactions with the reactions that degrade polymer viscosity. It is preferred that the pH value be maintained at or near the starting acidic pH during acid treatment by periodic or continuous addition of the acidic agent. Both organic and inorganic acid can be used herein in the present invention. An acid is defined as any proton doner. Suitable acids include hydrochloric acid, sulfuric acid, methanesulfonic acid, nitric acid, formic acid, phosphoric and acetic acid. Non-halogen containing acids, such as sulfuric acid, are preferred.

It is noted that following the guidelines and the non-limiting examples, set forth in the instant application one having ordinary skill in the art would be capable of determining treatment conditions and the balancing of treatment conditions to obtain hydrolysis of CPD-forming species to obtain in the desired molecular weight or viscosity.

The present invention can be applied on resins as produced in a resin synthesis process without further treatment. Moreover, the resins can be treated by various processes prior to reduction and/or removal of the CPD-forming species. Still further, after treatment to reduce and/or remove CPD-forming species, the resin can be treated by various processes. Yet still further, the resin can be treated by various processes prior to reduction and/or removal of the CPD-forming species, and the resin can also be treated by various processes after treatment to reduce and/or remove CPD-forming species. Further treatment types include but are not limited to carbon treatment, solvent extraction, membrane separation and biodehalogenation.

Resins Treated by the Present Invention

The resins that can be treated with base treatment followed by the mild acid treatment according to the present invention can comprise any polyamine-epihalohydrin resins. This invention is also directed towards the preparation, use and treatment of polyamine-epihalohydrin resins, such as polyaminopolyamide-epichlorohydrin resins, made by reacting epihalohydrin, such as epichlorohydrin, with a prepolymer (also interchangeably referred to herein as polymer), such as polyaminopolyamide prepolymer. In the case of polyaminopolyamide-epihalohydrin resins, it is noted that the polyaminoamide prepolymer is also referred to as polyamidoamine, polyaminopolyamide, polyamidopolyamine, polyamidepolyamine, polyamide, basic polyamide, cationic polyamide, aminopolyamide, amidopolyamine or polyaminamide.

A preferred group of polymers for use in the present invention includes cationic polymers, alone or together with other polymers. Particularly preferred cationic polymers include those used for the purpose of imparting wet strength to paper. A listing of many polymers useful in papermaking formulations, such as wet strength agents, is described in Paper Chemistry, pages 78–96, published in the USA by Chapman Hall, New York. Chapter 6 of this book is entitled "Wet Strength Chemistry", and is hereby incorporated, in its entirety, by reference thereto. Several classes of polymers are described which are used to impart wet strength to paper, including: polyaminoamide-epichlorohydrin resins and epoxidized polyamide resins, among others.

The invention is directed to treatment of cationic polymers such as polyamine-epihalohydrin resins which may be used alone or in combination with other polymers used for the wet strengthening of paper. These resins include epihalohydrin resins and nitrogen-containing cationic polymers, both of which are derived from epihalohydrin reactants. Preferred resins for the purposes of this invention include polyaminoamide-epihalohydrin wet-strength resins as described in U.S. Pat. Nos. 2,926,154; 3,332,901; 3,891,589; 3,197,427; 4,240,935, 4,857,586; 5,171,795 and 5,714,552, European Patent Publication 0,349,935, and Great Britain Patent 865,727. It is noted that these resins are generally referred to herein as polyamine-epihalohydrin resins, and such resins include, but are not limited to, polyaminopolyamide-epihalohydrin resins (which are also known as polyaminoamide-epihalohydrin resins, polyamidepolyamine-epihalohydrin resins, polyaminepolyamide-epihalohydrin resins, aminopolyamide-epihalohydrin resins, polyamide-epihalohydrin resins); polyalkylene polyamine-epihalohydrin; and polyaminourylene-epihalohydrin resins, copolyamide-polyurylene-epihalohydrin resins, polyamide-polyurylene-epihalohydrin resins, with the epihalohydrin preferably being epichlorohydrin in each instance.

Exemplary resins are also described in U.S. Pat. No. 6,554,961. One preferred type of resin is one that has azetidinium functionality. Exemplary epihalohydrin resins are characterized by the presence of N-halohydrin groups and 3-hydroxyazetidinium chloride groups.

Preferred polyamines for this invention are produced by reacting a dicarboxylic acid, or a derivative thereof, with a polyalkylenepolyamine containing from two to four alkylene groups having two to four carbons, two primary amine groups, and one to three secondary amine groups. Dicarboxylic acid derivatives suitable for preparing the polyaminoamides include esters, anhydrides and acid halides.

Procedures for preparing polyaminoamides from polyalkylenepolyamines are described in U.S. Pat. No. 2,926,154, to Keim, which is incorporated herein by reference in its entirety.

Expanding upon the above, polyaminopolyamide-epichlorohydrin resins comprise the water-soluble polymeric reaction product of epichlorohydrin and polyamide derived from polyalkylene polyamine and saturated aliphatic dibasic carboxylic acid containing from about 2 to about 10 carbon atoms. It has been found that resins of this type impart wet-strength to paper whether made under acidic, alkaline or neutral conditions. Moreover, such resins are substantive to cellulosic fibers so that they may be economically applied thereto while the fibers are in dilute aqueous suspensions of the consistency used in paper mills.

Epihalohydrin to Amine Ratio

The preferred resins used in the present invention are those with lower epihalohydrin to amine ratios. Epihalohydrin is also referred to as "epi". When the amount of epihalohydrin decreases and the amine increases, the epihalohydrin to amine ratio changes from 1.2:1.0, to 1.15:1.0, to 1.1:1.0, to 1.09:1.0, to 1.08:1.0, to 1.05:1.0, to 1.0:1.0, to 0.97:1.0, to 0.8:1.0 to 0.5:1.0 etc., the conditions at which the resin must be treated to achieve a usable stable resin surprisingly narrows. The balancing of the conditions becomes integral to obtaining a stable resin.

For wet strength agents, while epihalohydrin: amine ratios greater than 1.5 can be utilized, it is preferred that the resin comprise a resin formed in a polyamide-epihalohydrin reaction having a molar ratio of epihalohydrin to secondary amine group of less than 1.2, more preferably the molar ratio of epihalohydrin to secondary amine group is less than about 1.15, more preferably the molar ratio of epihalohydrin to secondary amine group is less than about 1.1, more preferably the molar ratio of epihalohydrin to secondary amine group is less than about 1.09, more preferably the molar ratio of epihalohydrin to secondary amine group is less than about 1.08, more preferably the molar ratio of epihalohydrin to secondary amine group is less than about 1.05, more preferably the molar ratio of epihalohydrin to secondary amine group is less than about 1.0, more preferably the molar ratio of epihalohydrin to secondary amine group is less than about 0.975 with a preferred range of the molar ratio of epihalohydrin to secondary amine group being about 0.4 to 1.1, more preferably the molar ratio of epihalohydrin to secondary amine group being about 0.6 to 1.1, more preferably the molar ratio of epihalohydrin to secondary amine group being about 0.7 to 1.05, more preferably the molar ratio of epihalohydrin to secondary amine group being about 0.8 to 1.05, and even more preferably about 0.85 to 0.975. The present invention can also be used to treat resin useful as creping agents. Creping agents can have epihalohydrin to amine ratios of even lower than 0.6. As an example, for a polyamide made with a 1.0 to 1.0 molar ratio of adipic acid to diethylenetriamine, the following formula is used to calculate the molar ratio of epichlorohydrin to secondary amine group: $(A/92.5)/(B/213.3)$, where A is the epichlorohydrin weight (100% basis) and B is the dry weight of poly(adipic acid-co-diethylenetriamine).

CPD Production and Absorbable Organic Halogen

The resin composition produced utilizing the present invention when stored as an aqueous composition containing the resin, when stored at pH 1 for 24 hours at 50° C. and measured at 24 hours, produces less than about 250 ppm dry basis of CPD, even more preferably produces less than about 150 ppm dry basis of CPD, even more preferably produces less than about 100 ppm dry basis of CPD, even more preferably produces less than about 75 ppm dry basis of CPD, even more preferably produces less than about 50 ppm dry basis of CPD, even more preferably produces less than about 25 ppm dry basis of CPD, even more preferably produces less than about 15 ppm dry basis of CPD, even more preferably produces less than about 5 ppm dry basis of CPD.

Still further, the compositions of the present invention have reduced levels of adsorbable organic halogen (AOX). The present invention can reduce the AOX content to less than 75% of the initial value, preferably less than 60% of the initial value, and more preferably less than 50% of the initial value of the AOX content in the untreated resin on an equal actives basis. A Mitsubishi Kasei Corporation instrument (model TOX-10Σ) can be used for the AOX analysis, using the procedure described in the operating manual.

Azetidinium Level

Moreover, for wet strength agents to have high effectiveness, the azetidinium level is preferably maximized. Thus, preferably the azetidinium level of wet-strength agents of the present invention are greater than about 35 mole %, preferably greater than about 40 mole %, preferably greater than about 45 mole %, preferably greater than about 50 mole %, with preferred ranges of about 40 to 70 mole % and of about 40 to 65 mole % of about 45 to 65 mole % of about 50 to 65 mole %. The mole % azetidinium and the mole % of other species can be determined by NMR.

Other Treatments

As discussed above, resins having at least reduced levels of formation of CPD can be resins as produced in a resin synthesis process without further treatment. Moreover, the resins can be treated by various processes prior to reduction and/or removal of the CPD-forming species. The resin can be further treated to remove the residual 1,3-dichloropropanol (DCP) and free residual CPD to produce a resin with low level of CPD. Still further, after treatment to reduce and/or remove CPD-forming species, the resin can be treated by various processes. Yet still further, the resin can be treated by various processes both prior to reduction and/or removal of the CPD-forming species and after treatment to further reduce and/or remove CPD-forming species. For example, the resin can be treated by various processes, such as processes to remove low molecular weight epihalohydrin and epihalohydrin by-products, e.g., epichlorohydrin and epichlorohydrin by-products, for example, CPD in the resin solution. Without limiting the treatments or resins that can be utilized, it is noted that resins, could be treated prior to and/or subsequent to reduction or removal of CPD-forming species with a basic ion exchange column; with carbon adsorption; membrane separation, e.g., ultrafiltration; extraction, e.g, ethyl acetate; or biodehalogenation. Moreover, any combination of CPD-forming species reduction or removal can be utilized with the base treatment for reduction and/or removal of CPD-forming species.

Biodehalogenation can be achieved in various manners, such as disclosed in U.S. Pat. Nos. 5,470,742, 5,843,763, 5,871,616, 5,972,691, 6,554,961 and WO 96/40967, wherein the resin composition may be reacted with a microorganism or enzyme in adequate quantities to process epihalohydrin hydrolyzates to very low levels. Microorganisms use dehalogenase enzymes to liberate halide ion from the epihalohydrin and haloalcohol and then use further enzymes to break down the reaction products ultimately to carbon dioxide and water.

Paper Making:

The process for making paper utilizing the resin compositions treated by the invention comprises: (a) providing an aqueous pulp suspension; (b) adding to the aqueous pulp suspension the resin and (c) sheeting and drying the aqueous pulp suspension produced in (b) to obtain paper.

The aqueous pulp suspension of step (a) of the process is obtained by means well known in the art, such as known mechanical, chemical and semichemical, etc., pulping processes. Normally, after the mechanical grinding and/or chemical pulping step, the pulp is washed to remove residual pulping chemicals and solubilized wood components. Either bleached or unbleached pulp fiber may be utilized in the process of this invention. Recycled pulp fibers are also suitable for use.

In step (b), resin of this invention preferably is added to pulp slurry in a minimum amount of about 0.1 weight percent based on the dry weight of the pulp. A more preferable minimum amount is about 0.2 weight percent. The preferable maximum amount of resin composition is about 5 weight percent. A more preferable maximum is about 3 weight percent, and the most preferable maximum about 1.5 weight percent. The resin composition is generally added in the form of an aqueous solution. In addition to the resin, other materials normally used in paper may be added as well. These include, for example, sizing agents, pigments, alum, brightening agents, dyes and dry strength agents, added in amounts well known in the art.

Step (c) is carried out according to procedures well known to those skilled in the art of papermaking.

Paper Products

Moreover, paper products containing resins according to the present invention contain low levels of CPD and are capable of being stored without undue formation of CPD. Thus, paper products according to the present invention can have initial low levels of CPD, and can maintain low levels of CPD over an extended period storage time. More specifically, paper products according to the present invention, made with a 1 wt % addition level of resin, will contain less than about 600 parts per billion (ppb) of CPD and more preferably less than about 300 ppb of CPD when stored for periods as long as 2 weeks, preferably as long as at least 6 months, and even more preferably as long as at least one year. Moreover, paper products according to the present invention, made with about a 1 wt % addition level of resin, will have an increase in CPD content of less than about 300 ppb, more preferably less than about 200 ppb of CPD, more preferably less than about 100 ppb of CPD, even more preferably less than about 50 ppb of CPD, even more preferably less than about 10 ppb of CPD, and even more preferably less than about 1 ppb of CPD when stored for periods as long as 2 weeks, more preferably as long as at least 6 months, and even more preferably as long as at least one year. In other words, the paper products according to the present invention have storage stability and will not generate excessive CPD content in paper products when the paper products are stored as little as one day and for periods of time greater than one year. Thus, the resins according to the present invention give minimal formation of CPD in paper products, particularly those exposed to aqueous environments, especially hot aqueous environments, e.g., tea bag, coffee filters, etc. Further examples of paper products include packaging board grade, and tissue and towel grade.

Paper can be made by adding the resin at addition levels other than about 1 wt %; however, the CPD content should be corrected for the addition level. For example, for a paper product made by adding the resin at a 0.5 wt % addition level having a measured CPD content of 100 ppb, the corrected CPD on a 1 wt % addition level basis will be 200 ppb (100 ppb/0.5 percent addition level).

Test Procedures:

Measurement of CPD-Forming Species

The amount of CPD-forming species can be determined using the following test ("Acid Test"). A portion of resin to be tested is charged into a container containing a stirrer. The pH is adjusted to 1.0 with 96 wt % sulfuric acid. The container is closed and placed in a 50° C. water bath and maintained at 50° C. with stirring. An aliquot is removed from the container at 24 hours, and submitted for gas chromatographic (GC) analysis in the manner described below to provide an indication of the CPD-forming species.

GC Procedure and Instrumentation: GC was used to determine epi and epi by-products in the treated and untreated resins using the following method. The resin sample was absorbed onto an Extrelut column (available from EM Science, Extrelut QE, Part #901003-1) and extracted by passing ethyl acetate through the column. A portion of the ethyl acetate solution was chromatographed on a wide-bore capillary column. If flame ionization detector (FID) was used, the components are quantitated using n-octanol as the internal standard. If an electrolytic conductivity (ELCD) detector or if the halogen-specific (XSD) detector was used, an external standard method using peak matching quantitation was employed. The data system was either a Millennium 2010 or HP ChemStation. The FID detector was purchased from Hewlett-Packard (HP) as part of a Model 5890 GC. The ELCD detector, Model 5220, was purchased from OI Analytical. The XSD detector was purchased from OI Analytical, Model 5360 XSD. The GC instrument used was a HP Model 5890 series II. The column was DB-WAX (Megabore, J&W Scientific, Inc.) 30 m×0.53 mm with 1.5 micron film thickness. For the FID and ELCD, the carrier gas was helium with a flow rate of 10 mL/min. The oven program was 35° C. for 7 minutes, followed by ramping at 8° C./min to 200° C. and holding at 200° C. for 5 minutes. The FID used hydrogen at 30 mL/min and air at 400 mL/min at 250° C. The ELCD used n-propanol as the electrolyte with an electrolyte flow rate setting of 50% with a reactor temperature of 900° C. The XSD reactor was operated in an oxidative mode at 1100° C. with a high purity air flow rate of 25 mL/min.

NMR Procedure for Measuring Azetidinium Level:

The $^{13}$C NMR spectra are acquired using BRUKER AMX spectrometers equipped with a 10 mm broadband probe. A $^{13}$C NMR operating frequency of 100 MHz (AMX400) or 125 MHz (AMX500) is sufficient for data collection. In either case, the spectra are acquired with continuous $^1$H decoupling. Electronic integration of the appropiate signals provides molar concentrations of the following alkylation components; ACH, EPX, GLY, and AZE.

where:

ACH=polymeric aminochlorohydrins

EPX=polymeric epoxides

GLY=polymeric glycols

AZE=azetidinium ions

In order to calculate the concentrations of each of these species, the integral values must be placed on a one (1) carbon basis. For example, the spectral region between 20–42 ppm represents six (6) carbons of the diethylenetriamine-adipate backbone, hence the integral value is divided by six. This value is used as the polymer common denominator (PCD) for calculation of the alkylation species. The chemical shifts of these species are provided below (using an acetonitrile field reference of 1.3 ppm). The corresponding integral value of each alkylation product is used in the numerator for calculation, refer to examples below:

ACH signal at 68–69 ppm represents one carbon; integral of ACH÷PCD=mole fraction ACH GLY signal at 69–70 ppm represents one carbon; integral of GLY÷PCD=mole fraction GLY EPX carbon at 51–52 ppm represents one carbon; integral of EPX÷PCD=mole fraction EPX AZE signal at 73–74 ppm represents two carbons, thus, a division factor of two is required; integral of AZE/2÷PCD=mole fraction AZE The following spectral parameters are standard experimental conditions for $^{13}$C NMR analysis of base treated Kymene resins on the Bruker AMX400.

| Temperature | 25 C. |
| --- | --- |
| Resonance Frequency | 100 MHz |
| # Data Points | 64K |
| Dwell Time | 20 microseconds |
| Acquisition Time | 1.3 seconds |
| Sweep Width | 25000 Hz |
| Number of Scans | 1K |
| Relaxation Delay | 3 seconds |
| Pulse Tip Angle | 70 degrees |
| Pulse Program | zgdc |
| Processed Spectral Size | 64K |
| Apodization Function | exponential |
| Line Broadening | 3 Hz |

Test for Measuring CPD

To measure CPD in paper products, the paper product is extracted with water according to the method described in European standard EN 647, dated October 1993. Then 5.80 grams of sodium chloride is dissolved into 20 ml of the water extract. The salted aqueous extract is transferred to a 20 gram capacity Extrelut column and allowed to saturate the column for 15 minutes. After three washes of 3 ml ethyl acetate and saturation of the column, the Extrelut column is eluted until 300 ml of eluent has been recovered in about 1 hour. The 300 ml of ethyl acetate extract is concentrated to about 5 ml using a 500-ml Kuderna-Danish concentrating apparatus (if necessary, further concentrating is done by using a micro Kuderna-Danish apparatus). The concentrated extract is analyzed by GC using the procedure and instrumentation described above. Typically, an electrolytic conductivity detector (ELCD) or a halogen-specific detector (XSD) is used. Other sensitive detectors can be used, e.g., electron capture detectors.

An additional method used to measure CPD in paper products is the following. The paper product is extracted with water according to the method described in European standard EN 647, dated October 1993. A 20 mL aliquot of the extract is then added to a 35 ml vial containing 2.3 g of NaCl and shaken until the NaCl dissolves. The solution is then added to an SPE column that is packed with Varian Hydromatrix™ (diatomaceous earth) and allowed to sit for 15 minutes. After the 15 minutes, CPD is eluted with 250 ml of 95% diethyl ether/isooctane. The eluent is then concentrated using a rotary evaporator to a volume of approximately 15 ml. At this point, 1 ml of an internal standard (3-methoxy-1,2-propanediol ~0.25 ug/ml) is added to the solution followed by addition of 200 uL of the derivatizing agent heptafluro-butrylimadazole. The solution is then allowed to stand for 15 minutes at room temperature. After the 15 minutes, the solution is then quantitatively transferred to a 25 ml volumetric flask and brought to volume with iso-octane. Approximately 1.5 mL of reagent grade water is added to the volumetric flask, which is then shaken. After the phase separation, approximately 20 mL of the organic phase is removed and put into a 30 mL glass vial, which contains 2 ml of reagent grade water. The vial is then shaken vigorously for 1 minute. After phase separation the organic phase is analyzed by gas chromatography using a μ-Electron Capture detector (ECD).

In order to more clearly describe the present invention, the following non-limiting examples are provides for the purpose of representation, and are not to be construed as limiting the scope of the invention. All parts and percentages in the examples are by weight unless indicated otherwise. Moreover, ND in the Examples indicates "Not Detected".

EXAMPLES

Unless otherwise noted, Brookfield Viscosity was determined with a Brookfield LVDV-II+ Programmable Viscometer at 25° C. The procedure used was based on the Operating Instructions, Manual No. M/97-164. This Viscometer will determine viscosity only if the correct spindle and rpm is used for the viscosity of the sample.

Example 1

0.92:1.0 epi:amine Ratio, No Acid Treatment Process, 12.5% Actives Process

A 1-liter, round-bottom flask was fitted with an overhead stirrer, a condenser, pH and temperature probes, a syringe pump and a temperature-controlled water bath. The flask was charged with 864.0 g of 13.4% Kymene® 625LX wet-strength resin (Available from Hercules Incorporated, Wilmington, Del.; 25.4% total solids, 192 cps, and 47 mole % azetidinium, diluted to 13.4%). The resin was heated to 40.0° C. and then 48.25 g of 25% aqueous sodium hydroxide (NaOH) was added over 5 minutes with a syringe pump. At the finish of the NaOH feed, the pH was 11.10 (measured at 40° C.). Initially the viscosity decreased. The viscosity started to increase after 13 minutes after the start of the NaOH addition. After 31 minutes after the start of the NaOH addition, the viscosity had increased the desired amount and the reaction was quenched from pH 10.06 to 2.5 (measured at 40° C.) with 11.53 g of 96% sulfuric acid. The resin had a pH of 2.5 (measured at 25° C.), a Brookfield viscosity of 32 cps (at 25° C.), 14.5% total solids, and 47 mole % azetidinium. To a portion of the resin was added 0.1 wt. % formic acid (dry wt. formic acid to wet wt. of resin) and 200 ppm of potassium sorbate. Aging studies at 25° C. were conducted (see Table 1). The aging data show that a resin produced without an acid treatment is not very stable against gelation, even when the resin pH was lowered to pH 2.5 or when 0.1 wt. % formic acid was added.

TABLE 1

| Example 1 (14.5%) Stabilization | Days aging at 25° C., Brookfield Viscosity (cps) | | | | | | | |
| --- | --- | --- | --- | --- | --- | --- | --- | --- |
| conditions | 0 | 1 | 4 | 7 | 14 | 21 | 27 | 35 |
| pH 2.5, no formic acid | 32.4 | 34 | 49.4 | 72.3 | gel | — | — | — |
| pH 2.5, 0.1% formic acid | 32.4 | 33.3 | 38.7 | 45.1 | 62.8 | 80.3 | 111.5 | gel |

Example 2

Repeat Example 1 but More Base, 12.5% Actives Process

A 1-liter, round-bottom flask was fitted with an overhead stirrer, a condenser, pH and temperature probes, a syringe pump and a temperature-controlled water bath. The flask was charged with 864.0 g of 13.4% Kymene® 625LX wet-strength resin (Available from Hercules Incorporated, Wilmington, Del.; 25.4% total solids, 192 cps, and 47 mole % azetidinium, diluted to 13.4%). The resin was heated to 40.0° C. and then 55.68 g of 25% aqueous sodium hydroxide (NaOH) was added over 5 minutes with a syringe pump. At the finish of the NaOH feed, the pH was 11.43 (measured at 40° C.). Initially the viscosity decreased. The viscosity started to increase after 17 minutes after the start of the NaOH addition. After 53 minutes after the start of the NaOH addition, the viscosity had increased the desired amount and the reaction was quenched from pH 10.83 to 2.5 (measured at 40° C.) with 13.35 g of 96% sulfuric acid. The resin had a pH of 2.6 (measured at 25° C.), a Brookfield viscosity of 27 cps (at 25° C.), and 14.6% total solids. To a portion of the resin was added 0.1 wt. % formic acid (dry wt. formic acid to wet wt. of resin) and 200 ppm of potassium sorbate. With two other portions of resin, the pH was lower to 2.3 and to 2.1 with 96% sulfuric acid and 200 ppm of potassium sorbate was added. Aging studies at 25° C. were conducted (see Table 2).

The aging data from Tables 1 and 2 show that a resin produced without an acid treatment is not very stable against gelation, even when the resin pH was lowered to pH 2.1 or when 0.1 wt. % formic acid was added.

TABLE 2

| Example 2 (14.6%) | Days aging at 25° C., Brookfield Viscosity (cps) | | | | | | | | |
|---|---|---|---|---|---|---|---|---|---|
| Stabilization conditions | 0 | 1 | 2 | 3 | 4 | 7 | 14 | 21 | 28 |
| pH 2.6, no formic acid | 27 | 32 | 37 | 45 | 55 | 92 | gel | — | — |
| pH 2.6, 0.1% formic acid | 27 | 30 | 34 | 38 | 42 | 53 | 89 | gel | — |
| pH 2.3, no formic acid | — | 30 | 33 | 38 | 43 | 58 | 131 | gel | — |
| pH 2.1, no formic acid | — | 29 | 31 | 34 | 37 | 45 | 69 | 115 | gel |

Example 3

Repeat Example 2 but with Acid Treatment Process, 12.5% Actives Process

A 1-liter, round-bottom flask was fitted with an overhead stirrer, a condenser, pH and temperature probes, a syringe pump and a temperature-controlled water bath. The flask was charged with 864.0 g of 13.4% Kymene® 625LX wet-strength resin (Available from Hercules Incorporated, Wilmington, Del.; 25.4% total solids, 192 cps, and 47 mole % azetidinium, diluted to 13.4%). The resin was heated to 40.0° C. and then 55.68 g of 25% aqueous sodium hydroxide (NaOH) was added over 5 minutes with a syringe pump. At the finish of the NaOH feed, the pH was 11.22 (measured at 40° C.). Initially the viscosity decreased. The viscosity started to increase after 21 minutes after the start of the NaOH addition. After 57 minutes after the start of the NaOH addition, the viscosity had increased the desired amount and the reaction was quenched from pH 10.57 to 2.4 (measured at 40° C.) with 13.53 g of 96% sulfuric acid. A 10.3 g aliquot was removed for analysis and the reaction mixture was heated to 60° C. over 30 minutes (pH reading of 2.65 at 60° C.). After 30 minutes at 60° C., the pH was lower from 2.90 to 2.60 (pH reading at 60° C.) with 0.73 g of 96% sulfuric acid. After 60 minutes at 60° C., the pH was lower from 2.76 to 2.60 (pH reading at 60° C.) with 0.45 g of 96% sulfuric acid. After 90 minutes at 60° C., the pH was lower from 2.69 to 2.60 (pH reading at 60° C.) with 0.22 g of 96% sulfuric acid. After 120 minutes at 60° C., the reaction mixture was cooled to 40° C. within 7 minutes and 25° C. within 24 minutes. The pH was lowered from 2.50 to 2.38 with 0.21 g of 96% sulfuric acid. The resin had a Brookfield viscosity of 37 cps (at 25° C.), 14.8% total solids, and 43 mole % azetidinium. To a portion of the resin was added 0.1 wt. % formic acid (dry wt. formic acid to wet wt. of resin) and 200 ppm of potassium sorbate. Aging studies at 25° C. and 32° C. (started after 7 days at 25° C.) were conducted (see Table 3).

TABLE 3

| Example 3 (14.8%) | Days aging at 25° C., Brookfield Viscosity (cps) | | | | | | | | | | |
|---|---|---|---|---|---|---|---|---|---|---|---|
| Stabilization conditions | 0 | 1 | 3 | 7 | 14 | 21 | 28 | 34 | 41 | 49 | 91 | 120 |
| pH 2.4, no formic acid | 37 | 35 | 34 | 33 | 30 | 29 | 29 | 27 | 28 | 34 | 38 | 51 |
| pH 2.4, 0.1% formic acid | 37 | 35 | 33 | 30 | 25 | 25 | 24 | 22 | 19 | 21 | 18 | 19 |

| Example 3 (14.8%) | Days aging at 32° C., Brookfield Viscosity (cps) | | | | | | | | | | |
|---|---|---|---|---|---|---|---|---|---|---|---|
| Stabilization conditions | 0 | 7 | 14 | 21 | 27 | 34 | 42 | 48 | 54 | 62 | 78 | — |
| pH 2.4, no formic acid | 33 | 30 | 31 | 34 | 37 | 50 | 74 | 80 | 95 | 121 | gel | — |

Example 4

Repeat Similar to Example 3 with Kymene 624 which has 0.975:1.0 epi:amine Ratio

A 1-liter, round-bottom flask was fitted with an overhead stirrer, a condenser, pH and temperature probes, a syringe pump and a temperature-controlled water bath. The flask was charged with 650.0 g of 20.0% Kymene® 624 wet-strength resin (Available from Hercules Incorporated, Wilmington, Del.; Voreppe, France plant, 21.0% total solids, 112 cps, pH 3.03, and 59 mole % azetidinium, diluted to 20.0%). The resin was heated to 40.0° C. and then 58.24 g of 25% aqueous sodium hydroxide (NaOH) was added over 5 minutes with a syringe pump. At the finish of the NaOH feed, the pH was 11.37 (measured at 40.0° C.). Initially the viscosity decreased. The viscosity started to increase after 15 minutes after the start of the NaOH addition. After 20 minutes after the start of the NaOH addition, the viscosity had increased the desired amount and the reaction was quenched from pH 11.2 to 2.2 (measured at 40° C.) with 16.49 g of 96% sulfuric acid. An 11.3 g aliquot was removed for analysis and the reaction mixture was heated to 60° C. over 30 minutes (pH reading of 2.48 at 60° C.). After 30 minutes at 60° C., the pH was lower from 2.72 to 2.49 (pH reading at 60° C.) with 0.58 g of 96% sulfuric acid. After 60 minutes at 60° C., the pH was lower from 2.63 to 2.49 (pH reading at 60° C.) with 0.37 g of 96% sulfuric acid. After 90 minutes at 60° C., the pH was lower from 2.57 to 2.47 (pH reading at 60° C.) with 0.25 g of 96% sulfuric acid. After 120 minutes at 60° C., the reaction mixture was cooled to 40° C. within 5 minutes and 25° C. within 24 minutes. The resin had a pH of 2.31, a Brookfield viscosity of 71 cps (at 25° C.), 21.5% total solids, and 52 mole % azetidinium. To a portion of the resin was added 0.2 wt. % formic acid (dry wt. formic acid to wet wt. of resin) and 200 ppm of potassium sorbate. To another portion of the resin was added 0.1 wt. % formic acid and 200 ppm of potassium sorbate. Another portion of the resin was diluted to 14.5% total solids [Brookfield viscosity of 31 cps (at 25° C.)] and 200 ppm of potassium sorbate was added. Aging studies at 32° C. were conducted (see Table 4).

TABLE 4

| Example 4 | Days aging at 32° C., Brookfield Viscosity (cps) | | | | | | | | | | | | |
|---|---|---|---|---|---|---|---|---|---|---|---|---|---|
| Stabilization conditions | 0 | 2 | 7 | 14 | 21 | 30 | 36 | 43 | 58 | 71 | 86 | 93 | 112 | 133 |
| 21.5%, 0.2% formic acid | 71 | 60 | 40 | 38 | 43 | 48 | 55 | 70 | 116 | 212 | gel | — | — | — |
| 21.5%, 0.1% formic acid | 71 | 61 | 45 | 51 | 72 | 120 | 216 | gel | — | — | — | — | — | — |
| 14.5%, no formic acid | 31 | 25 | 18 | 16 | 18 | 18 | 19 | 21 | 25 | 30 | 35 | 39 | 42 | 48 |

Example 5

Repeat Example 4, but More Base

A 1-liter, round-bottom flask was fitted with an overhead stirrer, a condenser, pH and temperature probes, a syringe pump and a temperature-controlled water bath. The flask was charged with 650.0 g of 20.0% Kymene® 624 wet-strength resin (Available from Hercules Incorporated, Wilmington, Del.; Voreppe, France plant, 21.0% total solids, 112 cps, pH 3.03, and 59 mole % azetidinium, diluted to 20.0%). The resin was heated to 40.0° C. and then 66.5 g of 25% aqueous sodium hydroxide (NaOH) was added over 5 minutes with a syringe pump. At the finish of the NaOH feed, the pH was 11.64 (measured at 40.0° C.). Initially the viscosity decreased. The viscosity started to increase after 13 minutes after the start of the NaOH addition. After 23 minutes after the start of the NaOH addition, the viscosity had increased the desired amount and the reaction was quenched from pH 11.59 to 2.5 (measured at 40° C.) with 18.07 g of 96% sulfuric acid. An 12.3 g aliquot was removed for analysis and the reaction mixture was heated to 60° C. over 30 minutes (pH reading of 2.82 at 60° C., pH reading of 2.93 at 25° C.). After 30 minutes at 60° C., the pH was lower from 3.11 to 2.53 (pH readings at 60° C.) with 1.15 g of 96% sulfuric acid. After 60 minutes at 60° C., the pH was lower from 2.69 to 2.50 (pH readings at 60° C.) with 0.49 g of 96% sulfuric acid. After 90 minutes at 60° C., the pH was lower from 2.58 to 2.50 (pH reading at 60° C.) with 0.17 g of 96% sulfuric acid. After 120 minutes at 60° C., the reaction mixture was cooled to 40° C. within 5 minutes and 25° C. within 20 minutes. The resin had a pH of 2.4, a Brookfield viscosity of 78 cps (at 25° C.), 21.6% total solids and 51 mole % azetidinium. To a portion of the resin was added 0.2 wt. % formic acid (dry wt. formic acid to wet wt. of resin) and 200 ppm of potassium sorbate. To another portion of the resin was added 0.1 wt. % formic acid and 200 ppm of potassium sorbate. Another portion of the resin was diluted to 14.5% total solids [Brookfield viscosity of 32 cps (at 25° C.)] and 200 ppm of potassium sorbate was added. Aging studies at 32° C. were conducted (see Table 5).

Example 6

Repeat Example 4, but Less Base

A 1-liter, round-bottom flask was fitted with an overhead stirrer, a condenser, pH and temperature probes, a syringe pump and a temperature-controlled water bath. The flask was charged with 650.0 g of 20.0% Kymene® 624 wet-strength resin (Available from Hercules Incorporated, Wilmington, Del.; Voreppe, France plant, 21.0% total solids, 112 cps, pH 3.03, and 59 mole % azetidinium, diluted to 20.0%). The resin was heated to 40.0° C. and then 49.92 g of 25% aqueous sodium hydroxide (NaOH) was added over 5 minutes with a syringe pump. At the finish of the NaOH feed, the pH was 11.06 (measured at 40.0° C.). Initially the viscosity decreased. The viscosity started to increase after 9 minutes after the start of the NaOH addition. After 14 minutes after the start of the NaOH addition, the viscosity had increased the desired amount and the reaction was quenched from pH 10.67 to 2.3 (measured at 40° C.) with 14.11 g of 96% sulfuric acid. An 12.4 g aliquot was removed for analysis and the reaction mixture was heated to 60° C. over 30 minutes (pH reading of 2.71 at 60° C.). The pH was lower from 2.71 to 2.44 (pH readings at 60° C., pH 2.44 at 60° C. was 2.28 at 25° C.) with 0.65 g of 96% sulfuric acid. After 30 minutes at 60° C., the pH was lower from 2.73 to 2.52 (pH readings at 60° C., pH 2.52 at 60° C. was 2.35 at 25° C.) with 0.55 g of 96% sulfuric acid. After 60 minutes at 60° C., the pH was lower from 2.67 to 2.52 (pH readings at 60° C., pH 2.52 at 60° C. was 2.34 at 25° C.) with 0.37 g of 96% sulfuric acid. After 90 minutes at 60° C., the pH was lower from 2.63 to 2.52 (pH reading at 60° C., pH 2.52 at 60° C. was 2.33 at 25° C.) with 0.26 g of 96% sulfuric acid. After 120 minutes at 60° C., the reaction mixture was cooled to 40° C. within 10 minutes and 25° C. within 20 minutes. The resin had a pH of 2.5, a Brookfield viscosity of 88 cps (at 25° C.), and 21.4% total solids. To a portion of the resin was added 0.1 wt. % formic acid (dry wt. formic acid to wet wt. of resin) and 200 ppm of potassium sorbate. Another portion of the resin was diluted to 15.0% total solids [Brookfield viscosity of 40 cps (at 25° C.)] and 200 ppm of potassium sorbate was added. To a portion of the diluted resin was added 0.1 wt % formic acid. Aging studies at 32° C. were conducted (see Table 6).

TABLE 5

| Example 5 | Days aging at 32° C., Brookfield Viscosity (cps) | | | | | | |
|---|---|---|---|---|---|---|---|
| Stabilization conditions | 0 | 4 | 7 | 15 | 21 | 28 | 35 |
| 21.5%, 0.2% formic acid | 78 | 54 | 53 | 50 | 54 | 59 | 72 |
| 21.5%, 0.1% formic acid | 78 | 58 | 63 | 68 | 86 | 123 | 199 |
| 14.5%, no formic acid | 32 | 23 | 22 | 21 | 21 | 23 | 26 |

TABLE 6

| Example 6 | Days aging at 32° C., Brookfield Viscosity (cps) | | | | | |
|---|---|---|---|---|---|---|
| Stabilization conditions | 0 | 2 | 7 | 14 | 22 | 43 |
| 21.4%, 0.1% formic acid | 88 | 72 | 56 | 54 | 60 | 246 |
| 15.0%, no formic acid | 40 | 33 | 27 | 24 | 24 | 27 |
| 15.0%, 0.1% formic acid | 40 | 31 | 23 | 19 | 17 | 16 |

Example 7

Repeat Similar to Example 4 with Kymene 624LX

A 2-liter, round-bottom flask was fitted with an overhead stirrer, a condenser, pH and temperature probes, a syringe pump and a temperature-controlled water bath. The flask was charged with 1300.0 g of 20.0% Kymene® 624LX wet-strength resin (Available from Hercules Incorporated, Wilmington, Del.; 21.1% total solids, 205 cps, pH 3.36 and 59 mole % azetidinium, diluted to 20.0%). The resin was heated to 40.0° C. and then 116.48 g of 25% aqueous sodium hydroxide (NaOH) was added over 5 minutes with a syringe pump. At the finish of the NaOH feed, the pH was 11.39 (measured at 40.0° C.). Initially the viscosity decreased. The viscosity started to increase after 17 minutes after the start of the NaOH addition. After 25 minutes after the start of the NaOH addition, the viscosity had increased the desired amount and the reaction was quenched from pH 11.2 to 2.2 (measured at 40° C.) with 31.16 g of 96% sulfuric acid. A 12.37 g aliquot was removed for analysis and the reaction mixture was heated to 60° C. (pH reading of 2.78 at 60° C.). When the reaction mixture reached 60° C., the pH was lower from 2.78 to 2.43 (pH readings at 60° C., pH 2.43 at 60° C. was 2.27 at 25° C.) with 1.75 g of 96% sulfuric acid. After 30 minutes at 60° C., the pH was lower from 2.68 to 2.49 (pH readings at 60° C., pH 2.49 at 60° C. was 2.28 at 25° C.) with 1.03 g of 96% sulfuric acid. After 60 minutes at 60° C., the pH was lower from 2.61 to 2.53 (pH readings at 60° C., pH 2.53 at 60° C. was 2.36 at 25° C.) with 0.48 g of 96% sulfuric acid. After 90 minutes at 60° C., the pH was lower from 2.61 to 2.53 (pH readings at 60° C., pH 2.53 at 60° C. was 2.37 at 25° C.) with 0.51 g of 96% sulfuric acid. After 120 minutes at 60° C., the reaction mixture was cooled to 40° C. within 10 minutes and 25° C. within 23 minutes. The resin had a pH of 2.45 (at 25° C.), a Brookfield viscosity of 116 cps (at 25° C.), and 21.4% total solids. To a portion of the resin was added 0.1 wt. % formic acid (dry wt. formic acid to wet wt. of resin) and 200 ppm of potassium sorbate. Another portion of the resin was diluted to 15.0% total solids [Brookfield viscosity of 49 cps (at 25° C.)] and 200 ppm of potassium sorbate was added. Another portion of the resin was diluted to 15.0% total solids and 0.1 wt. % formic acid and 200 ppm of potassium sorbate was added. Aging studies at 32° C. were conducted (see Table 7).

TABLE 7

| Example 7 Stabilization conditions | Days aging at 32° C., Brookfield Viscosity (cps) | | | | | | |
|---|---|---|---|---|---|---|---|
| | 0 | 2 | 10 | 29 | 51 | 70 | 93 |
| 21.4%, 0.1% formic acid | 116 | 91 | 81 | 199 | gel | — | — |
| 15.0%, no formic acid | 49 | 40 | 34 | 39 | 105 | gel | — |
| 15.0%, 0.1% formic acid | 49 | 38 | 29 | 23 | 25 | 29 | 36 |

Example 8

Repeat Example 7 Except with a Higher pH for the Acid Stabilization

A 2-liter, round-bottom flask was fitted with an overhead stirrer, a condenser, pH and temperature probes, a syringe pump and a temperature-controlled water bath. The flask was charged with 1300.0 g of 20.0% Kymene® 624 wet-strength resin (Available from Hercules Incorporated, Wilmington, Del.; 21.1% total solids, 205 cps, pH 3.36 and 59 mole % azetidinium, diluted to 20.0%). The resin was heated to 40.0° C. and then 116.48 g of 25% aqueous sodium hydroxide (NaOH) was added over 5 minutes with a syringe pump. At the finish of the NaOH feed, the pH was 11.35 (measured at 40.0° C.). Initially the viscosity decreased. The viscosity started to increase after 15 minutes after the start of the NaOH addition. After 24 minutes after the start of the NaOH addition, the viscosity had increased the desired amount and the reaction was quenched from pH 11.2 to 2.7 (measured at 40° C.) with 29.82 g of 96% sulfuric acid. A 12.68 g aliquot was removed for analysis and the reaction mixture was heated to 60° C. (pH reading of 3.11 at 60° C.). When the reaction mixture reached 60° C., the pH was lower from 3.11 to 2.70 (pH readings at 60° C., pH 2.70 at 60° C. was 2.74 at 25° C.) with 1.55 g of 96% sulfuric acid. After 30 minutes at 60° C., the pH was lower from 3.00 to 2.69 (pH readings at 60° C., pH 2.69 at 60° C. was 2.67 at 25° C.) with 1.19 g of 96% sulfuric acid. After 60 minutes at 60° C., the pH was lower from 2.88 to 2.67 (pH readings at 60° C., pH 2.67 at 60° C. was 2.65 at 25° C.) with 0.88 g of 96% sulfuric acid. After 90 minutes at 60° C., the pH was lower from 2.77 to 2.66 (pH readings at 60° C., pH 2.66 at 60° C. was 2.63 at 25° C.) with 0.48 g of 96% sulfuric acid. After 120 minutes at 60° C., the reaction mixture was cooled to 40° C. within 5 minutes and 25° C. within 30 minutes. The resin had a pH of 2.75 (at 25° C.), a Brookfield viscosity of 111 cps (at 25° C.), and 21.4% total solids. To a portion of the resin was added 0.1 wt. % formic acid (dry wt. formic acid to wet wt. of resin) and 200 ppm of potassium sorbate. Another portion of the resin was diluted to 15.0% total solids [Brookfield viscosity of 48 cps (at 25° C.)] and 200 ppm of potassium sorbate was added. Another portion of the resin was diluted to 15.0% total solids and 0.1 wt. % formic acid and 200 ppm of potassium sorbate was added. Aging studies at 32° C. were conducted (see Table 8).

TABLE 8

| Example 8 Stabilization conditions | Days aging at 32° C., Brookfield Viscosity (cps) | | | | | | |
|---|---|---|---|---|---|---|---|
| | 0 | 2 | 9 | 28 | 50 | 69 | 78 |
| 21.4%, 0.1% formic acid | 111 | 99 | 121 | gel | — | — | — |
| 15.0%, no formic acid | 48 | 43 | 43 | 116 | gel | — | — |
| 15.0%, 0.1% formic acid | 48 | 41 | 34 | 34 | 58 | 139 | gel |

Comparative Example 1 [relative to Example 1 (part b) U.S. Pat. No. 4,857,586]

A 1-liter, round-bottom flask was fitted with an overhead stirrer, a condenser, pH and temperature probes, and a temperature-controlled water bath. The flask was charged with 700.0 g of 15.0% Kymene® 624LX wet-strength resin (Available from Hercules Incorporated, Wilmington, Del.; 21.1% total solids, 205 cps, pH 3.36 and 59 mole % azetidinium, diluted to 15.0%). The resin was heated to 45° C. and then 28.74 g of 45% aqueous sodium hydroxide (NaOH) was added to give pH 11.05 (pH measured at 47° C.). The NaOH addition increased the temperature to the targeted 47° C. The viscosity was monitored. After 20 minutes, the resin gelled and was discarded.

This result is different than Example 1 (part b) U.S. Pat. No. 4,857,586 which indicates a 45 minute reaction time to obtain the desired viscosity of 53 mPas.

Comparative Example 2 [Relative to Example 2
U.S. Pat. No. 4,857,586]

A 1-liter, round-bottom flask was fitted with an overhead stirrer, a condenser, pH and temperature probes, and a temperature-controlled water bath. The flask was charged with 700.0 g of 15.0% Kymene® 624LX wet-strength resin (Available from Hercules Incorporated, Wilmington, Del.; 21.1% total solids, 205 cps, pH 3.36 and 59 mole % azetidinium, diluted to 15.0%). The resin was heated to 50° C. and then 15.71 g of 45% aqueous sodium hydroxide (NaOH) was added. The pH was maintained at 8.9–9.2 (pH measured at 50° C.) by constant addition of NaOH. After 4 minutes, the resin gelled.

This result is different than Example 2 U.S. Pat. No. 4,857,586 which indicates a 5 hour reaction time to obtain the desired viscosity of 40 mPas.

Comparative Example 3 (Comp 2 at 40° C.)
[Relative to Example 2 U.S. Pat. No. 4,857,586]

A 1-liter, round-bottom flask was fitted with an overhead stirrer, a condenser, pH and temperature probes, and a temperature-controlled water bath. The flask was charged with 700.0 g of 15.0% Kymene® 624LX wet-strength resin (Available from Hercules Incorporated, Wilmington, Del.; 21.1% total solids, 205 cps, pH 3.36 and 59 mole % azetidinium, diluted to 15.0%). The resin was heated to 40° C. and then 16.01 g of 45% aqueous sodium hydroxide (NaOH) was added. The pH was maintained at 8.9-9.2 (pH measured at 40° C.) by constant addition of NaOH. After 5 minutes, the resin gelled.

This result is different than Example 2 U.S. Pat. No. 4,857,586 which indicates a 5 hour reaction time to obtain the desired viscosity of 40 mPas, even when the treatment temperature was only 40° C.

Comparative Example 4 (Low-Viscosity Resin for
Base Treatment) [Relative to Example 2 U.S. Pat.
No. 4,857,586]

A 1-liter, round-bottom flask was fitted with an overhead stirrer, a condenser, pH and temperature probes, and a temperature-controlled water bath. The flask was charged with 700.0 g of 15.0% of low viscosity Kymene® 624LX wet-strength resin (Available from Hercules Incorporated, Wilmington, Del.; 23.43% total solids, 56 cps, pH 3.65 and 54 mole % azetidinium, diluted to 15.0%). The resin was heated to 50° C. and then 17.02 g of 45% aqueous sodium hydroxide (NaOH) was added. The pH was maintained at 8.9–9.1 (pH measured at 50° C.) by constant addition of NaOH. The viscosity was monitored. After 20 minutes, the resin gelled.

This result is different than Example 2 U.S. Pat. No. 4,857,586 which indicates a 5 hour reaction time to obtain the desired viscosity of 40 mPas, even though a low viscosity resin was used for the NaOH treatment.

Comparative Example 5 (Comp 4 at pH 11)
[Relative to Example 2 U.S. Pat. No. 4,857,586]

A 1-liter, round-bottom flask was fitted with an overhead stirrer, a condenser, pH and temperature probes, and a temperature-controlled water bath. The flask was charged with 700.0 g of 15.0% of low viscosity Kymene® 624LX wet-strength resin (Available from Hercules Incorporated, Wilmington, Del.; 23.43% total solids, 56 cps, pH 3.65 and 54 mole % azetidinium, diluted to 15.0%). The resin was heated to 50° C. and then 30.39 g of 45% aqueous sodium hydroxide (NaOH) was added to achieve pH 11.1. The pH was maintain at 11.0–11.1 (pH measured at 50° C.) by constant addition of NaOH. The viscosity was monitored. After 20 minutes, the resin gelled.

Comparative Example 6 (Comp 4 at pH 11.5)
[Relative to Example 2 U.S. Pat. No. 4,857,586]

A 1-liter, round-bottom flask was fitted with an overhead stirrer, a condenser, pH and temperature probes, and a temperature-controlled water bath. The flask was charged with 700.0 g of 15.0% of low viscosity Kymene® 624LX wet-strength resin (Available from Hercules Incorporated, Wilmington, Del.; 23.43% total solids, 56 cps, pH 3.65 and 54 mole % azetidinium, diluted to 15.0%). The resin was heated to 50° C. and then 37.35 g of 45% aqueous sodium hydroxide (NaOH) was added to achieve pH 11.6. The pH dropped to 11.5 (pH measured at 50° C.) within 20 minutes. The viscosity was monitored. After 20 minutes, the resin gelled and was discarded.

Comparative Example 7 and Examples 9–12

The resins analyzed in examples 9–12 were manufactured according to Example 7, see table 9.

TABLE 9

| Example | Description | AZE (mol %) | Percent Actives | AOX [% (w/w)] |
|---|---|---|---|---|
| Comp. Ex. 7 | Kymene 624LX | 58.4 | 20.3 | 0.34 |
| Example 9* | present invention | 54 | 12.5 | 0.11 |
| Example 10 | present invention | 52.5 | 12.5 | 0.12 |
| Example 11 | present invention | 53.6 | 12.5 | 0.12 |
| Example 12 | present invention | 53 | 12.5 | 0.10 |

*Example 9 made with the Kymene 624LX in Comp. Ex. 7

Examples 9–12 demonstrate a high level of azetidinium functionality can be achieved while reducing the AOX level.

The invention claimed is:

1. A process for producing a composition comprising a polyamine-epihalohydrin resin that has a low level of CPD-producing species and good gelation stability, comprising the steps: (A) preparing the resin with a ratio of epihalohydrin:amine of less than about 1.1:1.0; (B) treating a composition comprising a polyamine-epihalohydrin resin which includes CPD forming species with at least one basic agent, under conditions to at least one of reduce and remove the CPD-forming species; (C) subsequent to the base treatment, treating the composition comprising a polyamine-epihalohydrin resin at a temperature at least about 35° C. for a time about 20 minutes to 5 hours with at least one acidic agent, under conditions to obtain a gelation storage stable composition; and wherein the resulting reduced CPD-forming, gelation storage stable resin composition produces less than about 250 ppm dry basis of CPD, when stored at pH 1 for 24 hours at 50° C. and measured at 24 hours.

2. The process of claim 1 wherein the epihalohydrin:amine ratio is less than about 1.05:1.0.

3. The process of claim 1 wherein the epihalohydrin:amine ratio is less than about 1.0:1.0.

4. The process of claim 1 wherein the polyamine-epihalohydrin resin is a polyaminopolyamide-epihalohydrin resin.

5. The process of claim 1 wherein the epihalohydrin is epichlorohydrin.

6. The process of claim 1 wherein the azetidinium content of the resin is greater than 40 mole %.

7. The process of claim 1 wherein the resin composition has an active solids content of greater than 13%.

8. The process of claim 1 wherein the resin composition has an active solids content of greater than 15%.

9. The process of claim 1 wherein the temperature of step (B) is about 35° C. to about 55° C.

10. The process of claim 1 wherein the pH of step (B) is between 10.5 to about 12.5.

11. The process of claim 1 wherein the time for step (B) is about 10 minutes to about 2 hours.

12. The process of claim 1 wherein the basic agent is selected from sodium hydroxide, potassium hydroxide and combinations thereof.

13. The process of claim 1 wherein the pH of step (C) is between 1.0 and 4.0.

14. The process of claim 13 wherein the pH of step (C) is between 1.8 and 3.5.

15. The process of claim 1 wherein the pH value for step (C) is maintained at or near the starting acidic pH during acid treatment by periodic or continuous addition of the acidic agent.

16. The process of claim 1 wherein the acidic agent is a non-halogen containing acid.

17. The process of claim 1 wherein the acidic agent is sulfuric acid.

18. The process of claim 1 further comprising treatment of the resin either prior to or subsequent to steps (B) and (C) wherein the further treatment is by ionic exchange, membrane separation, biodehalogenation or carbon absorption.

19. The process of claim 1 wherein the resulting resin has an AOX content of less than 75% of the initial value of the AOX content in the untreated resin on an equal actives basis.

20. The process of claim 1 wherein the time of step (C) is about 30 minutes to 4 hours.

21. The process of claim 20 wherein the time of step (C) is about 40 minutes to 3 hours.

22. The process of claim 21 wherein the time of step (C) is about 50 minutes to 2.5 hours.

* * * * *